US009121724B2

(12) United States Patent
Piemonte et al.

(10) Patent No.: US 9,121,724 B2
(45) Date of Patent: Sep. 1, 2015

(54) 3D POSITION TRACKING FOR PANORAMIC IMAGERY NAVIGATION

(75) Inventors: Patrick Piemonte, San Francisco, CA (US); Billy Chen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 13/251,011

(22) Filed: Sep. 30, 2011

(65) Prior Publication Data

US 2013/0083055 A1   Apr. 4, 2013

(51) Int. Cl.
*G01C 21/36* (2006.01)
*G06T 19/00* (2011.01)

(52) U.S. Cl.
CPC .......... *G01C 21/3638* (2013.01); *G06T 19/003* (2013.01)

(58) Field of Classification Search
CPC ........................ G01C 21/3638; G06T 19/003
USPC ....................................................... 345/672
See application file for complete search history.

(56) References Cited

U.S. PATENT DOCUMENTS

| | | | | |
|---|---|---|---|---|
| 6,369,812 B1* | 4/2002 | Iyriboz et al. | ................. | 345/419 |
| 6,466,198 B1* | 10/2002 | Feinstein | ..................... | 345/158 |
| 2003/0210327 A1* | 11/2003 | Mory et al. | ..................... | 348/36 |
| 2003/0218638 A1* | 11/2003 | Goose et al. | .................. | 345/850 |
| 2006/0120624 A1* | 6/2006 | Jojic et al. | ..................... | 382/284 |
| 2008/0222295 A1* | 9/2008 | Robinson et al. | ............. | 709/227 |
| 2008/0291217 A1* | 11/2008 | Vincent et al. | ................. | 345/629 |
| 2009/0325607 A1* | 12/2009 | Conway et al. | ............ | 455/456.3 |
| 2010/0110025 A1* | 5/2010 | Lim | ............................. | 345/173 |
| 2010/0123737 A1* | 5/2010 | Williamson et al. | .......... | 345/672 |
| 2010/0174421 A1 | 7/2010 | Tsai et al. | | |
| 2010/0208029 A1 | 8/2010 | Marti et al. | | |
| 2010/0250120 A1* | 9/2010 | Waupotitsch et al. | ........ | 701/207 |
| 2010/0302280 A1* | 12/2010 | Szeliski et al. | ................ | 345/660 |
| 2011/0098918 A1* | 4/2011 | Siliski et al. | .................. | 701/201 |
| 2011/0141141 A1* | 6/2011 | Kankainen | .................... | 345/632 |
| 2011/0161875 A1* | 6/2011 | Kankainen | .................... | 715/810 |
| 2011/0173565 A1* | 7/2011 | Ofek et al. | .................... | 715/790 |
| 2011/0254915 A1* | 10/2011 | Vincent et al. | .................. | 348/36 |

(Continued)

OTHER PUBLICATIONS

Michael Rohs, Johannes Schöning, Martin Raubal, Georg Essl, and Antonio Krüger, Map Navigation with Mobile Devices: Virtual versus Physical Movement with and without Visual Context, Nov. 2007, ACM, ICMI '07, Proceedings of the 9th international conference on Multimodal interfaces, pp. 146-153.*

(Continued)

*Primary Examiner* — Jeffery A Brier
(74) *Attorney, Agent, or Firm* — Blakely, Sokoloff, Taylor & Zafman LLP (57) ABSTRACT

Position tracking subsystems and onboard sensors enable a mobile device to navigate virtually a location in panoramic imagery. Physically moving the device through space provides translation data that can be used to move up or down a virtual street or other navigation actions. In some implementations, forward and backward translation enables the user to enter a structure (e.g., a commercial venue) or enter an intersection and navigate a turn onto another street at the intersection. In some implementations, information or an information layer can be displayed when translating. In some implementations, distance data can be used to move up or down a street a particular distance. Distance data can be obtained from motion and/or image sensors onboard the device. The distance data can be scaled to a virtual distance in the panoramic scene.

36 Claims, 6 Drawing Sheets

(56) References Cited

U.S. PATENT DOCUMENTS

2011/0292166 A1* 12/2011 Schall et al. .................... 348/37
2012/0099804 A1* 4/2012 Aguilera et al. ............. 382/285
2012/0127169 A1* 5/2012 Barcay et al. ................ 345/419

OTHER PUBLICATIONS

Jonathan Mooser, Suya You, and Ulrich Neumann, Large Document, Small Screen: A Camera Driven Scroll and Zoom Control for Mobile Devices, Feb. 2008, ACM, I3D '08, Proceedings of the 2008 symposium on Interactive 3D graphics and games, pp. 27-34.*

Joel Johnson, Forget Apple TV. AirPlay is Apple's Sneak Attack on Television, Sep. 9, 2010, GIZMODO, http://gizmodo.com/5634087/forget-apple-tv-airplay-is-apples-sneak-attack-on-television, 8 pages.*

Sing Bing Kang and Pavan K. Desikan, Virtual Navigation of Complex Scenes using Clusters of Cylindrical Panoramic Images, Sep. 1997, Digital, Cambridge Research Laboratory, Technical Report Series, CRL 97/5, pp. 1-22.*

O. Akcay, Z. Duran, A. Garagon Doğru, G. Toz, and O. Altan, Panoramic Image Integration within a Web-Based GIS Application, Jul. 2004, In Proceedings of the XX Congress of ISPRS, Istanbul, Turkey, pp. 1-4.*

Polceanu Mihai, Popovici Alexandru, and Popovici Dorin-Mircea, A System for Panoramic Navigation Inside a 3D Environment, 2010, WSCG 2010 Communication Papers—18-th International Conference in Central Europe on Computer Graphics, Visualization and Computer Vision'2010, pp. 213-220.*

Wolfgang Hürst and Tair Bilyalov, Dynamic versus Static Peephole Navigation of VR Panoramas on Handheld Devices, Dec. 2010, Proceedings of the 9th International Conference on Mobile and Ubiquitous Multimedia, ACM, pp. 1-8.*

Paul A. Zandbergen, Accuracy of iPhone Locations: A Comparison of Assisted GPS, WiFi and Cellular Positioning, Jun. 26, 2009, Transactions in GIS 13.s1 (2009): 5-26, pp. 5-26.*

* cited by examiner

3D POSITION TRACKING FOR PANORAMIC IMAGERY NAVIGATION

TECHNICAL FIELD

This disclosure relates generally to graphical user interfaces (GUIs), and more particularly to GUIs for navigating panoramic imagery.

BACKGROUND

Street-level imaging software provides panoramic views from various positions along streets throughout the world. Conventional street-level viewing applications or Web-based street-level viewing services allow a user to rotate within a panoramic "bubble" to view a particular street location from all directions. The user can rotate in the bubble using a navigation control and an input device (e.g., a mouse) or finger. To turn a street corner and enter a another street (e.g., a street intersection), the user has to "jump" to a panoramic "bubble" at the intersection then pan in the bubble to face in the direction of the target street. This can be a tedious experience for a user of a handheld device that needs to navigate streets of a neighborhood quickly.

SUMMARY

Position tracking subsystems and onboard sensors enable a mobile device to navigate virtually a location in panoramic imagery. Physically moving the device through space provides translation data that can be used to move up or down a virtual street or other navigation actions. In some implementations, forward and backward translation enables the user to enter an indoor panorama of a structure (e.g., a commercial venue). When the observer is inside the structure, forward/backward translation could perform other actions, such as selecting an object for purchase, etc.

In some implementations, forward/backward translation enables the user to enter an intersection and navigate a turn onto another street at the intersection. In some implementations, information or an information layer can be displayed when translating. In some implementations, distance data can be used to move up or down a street a particular distance. Distance data can be obtained by integrating acceleration readings from a motion sensor (e.g., accelerometers) onboard the device. Distance data can also be obtained using an onboard camera by measuring translation of the device from image sensor data. For both motion and image sensors, the distance can be relative or absolute depending on the output of the motion or image sensors. The distance data can be scaled to a virtual distance in the panoramic scene. Alternatively, optical flow can be used to determine distance data.

Other implementations are directed to devices, systems and computer-readable mediums.

Particular implementations of the disclosed implementations provide one or more advantages, including but not limited to: 1) allowing a user to more easily navigate panoramic imagery using translations of a device; and 2) to allow a user to control the amount information presented in the panoramic scene using translations.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference-symbols in the various drawings indicate like elements.

DETAILED DESCRIPTION

Exemplary GUI for Navigating Panoramic Imagery

Figure 1A:
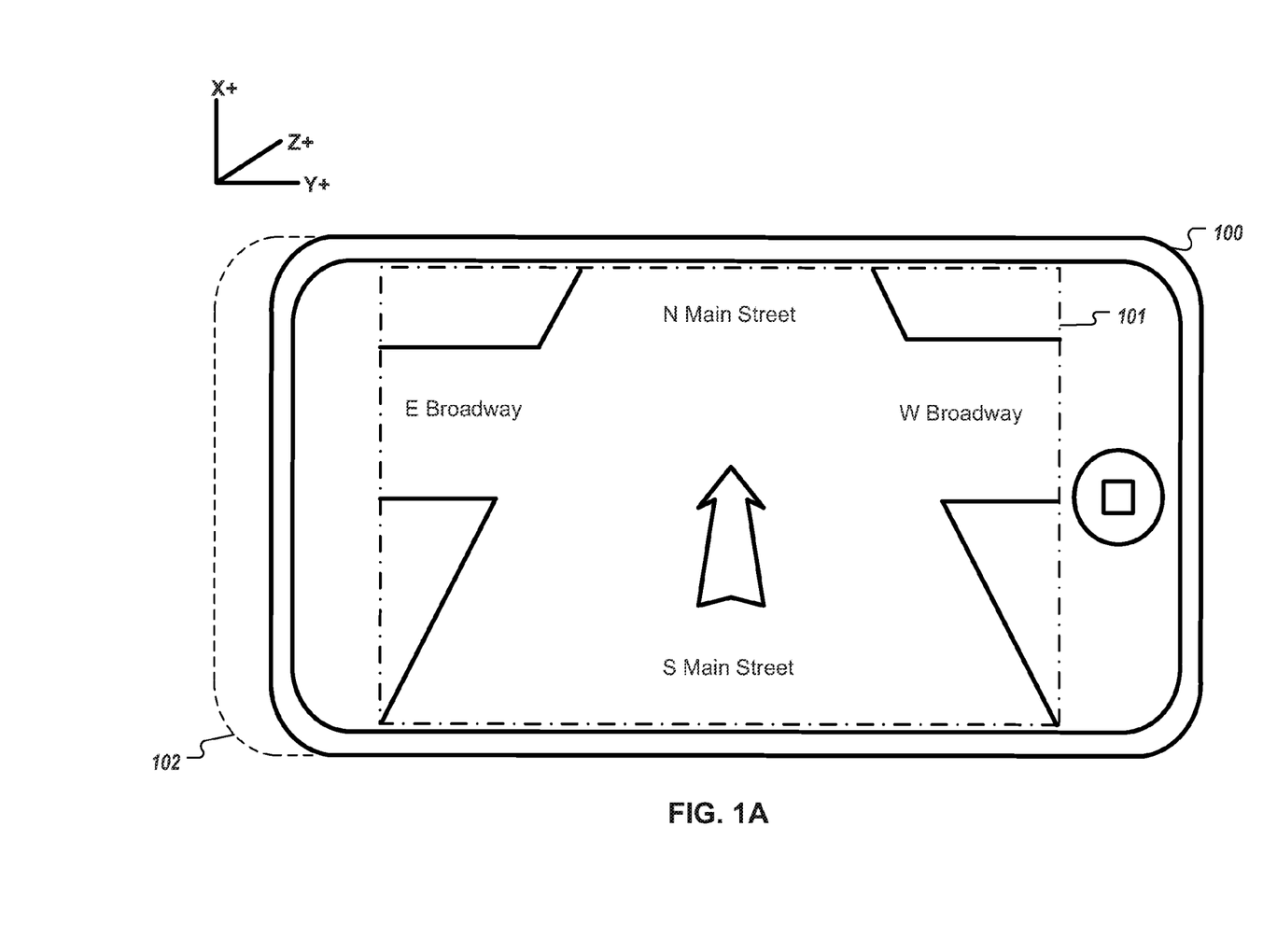
FIGS. 1A through 1C illustrate an exemplary GUI for navigating panoramic imagery based on sensed linear motion of a device.

FIG. 1A illustrates an exemplary GUI 101 for navigating panoramic imagery based on sensed linear motion (translation) of mobile device 100. In some implementations, GUI 101 is displayed on mobile device 100. Some examples of mobile devices include but are not limited to smart phones and electronic tablets. GUI 101 can be displayed on a touch sensitive surface, which can receive touch input and gestures from a user. In the description that follows, the term user refers to the individual holding the mobile device and performing the physical translations. The term "observer" is used to describe the "eye" or "camera" navigating the panoramic imagery.

In the example shown, device 100 is a smart phone that has been rotated by a user into a landscape orientation. GUI 101 could also be displayed in a portrait orientation. The user has entered into a street-level view at an intersection of Broadway and Main Street of a fictitious city. The user can enter the street-level view in a variety of ways. For example, the user could click an icon (e.g., a pushpin) on a map to enter a street-level view at the location of the icon on the map. The user could automatically enter street-level view by zooming into a particular location on a map or satellite image. A reference coordinate frame is shown in FIG. 1A for discussion purposes only, and may not be displayed in an actual implementation.

In this example, an observer is observing a street-level view of South Main Street at an intersection of virtual streets Main and Broadway. From this location in the panoramic imagery, the user can move device 100 physically from left to right, or forward or backward. These translations cause one or more onboard motion sensors to generate data that represents the motion, such as acceleration or velocity data. In some implementations, translations forward and backward (e.g., along +/−Z directions) result in movement up or down the virtual Main Street. For example, if the user moves device 100 forward or away from his body (+Z direction) the observer will cross Broadway and enter North Main Street. Likewise, if the user moves device 100 backward or towards his body (−Z direction) the observer will move down South Main Street and away from the intersection.

In another example, if the user moves device 100 to the left (−Y direction), the observer will automatically navigate the corner of South Main Street and East Broadway. If the user moves device 100 to the right (+Y direction), the observer will automatically navigate the corner of South Main Street and West Broadway.

In the example shown, the user has translated device 100 from a position 102 (indicated by a dashed outline) to the right or in the +Y direction. The result of this translation is displayed in GUI 101 as shown in FIG. 1B.

Figure 1B:
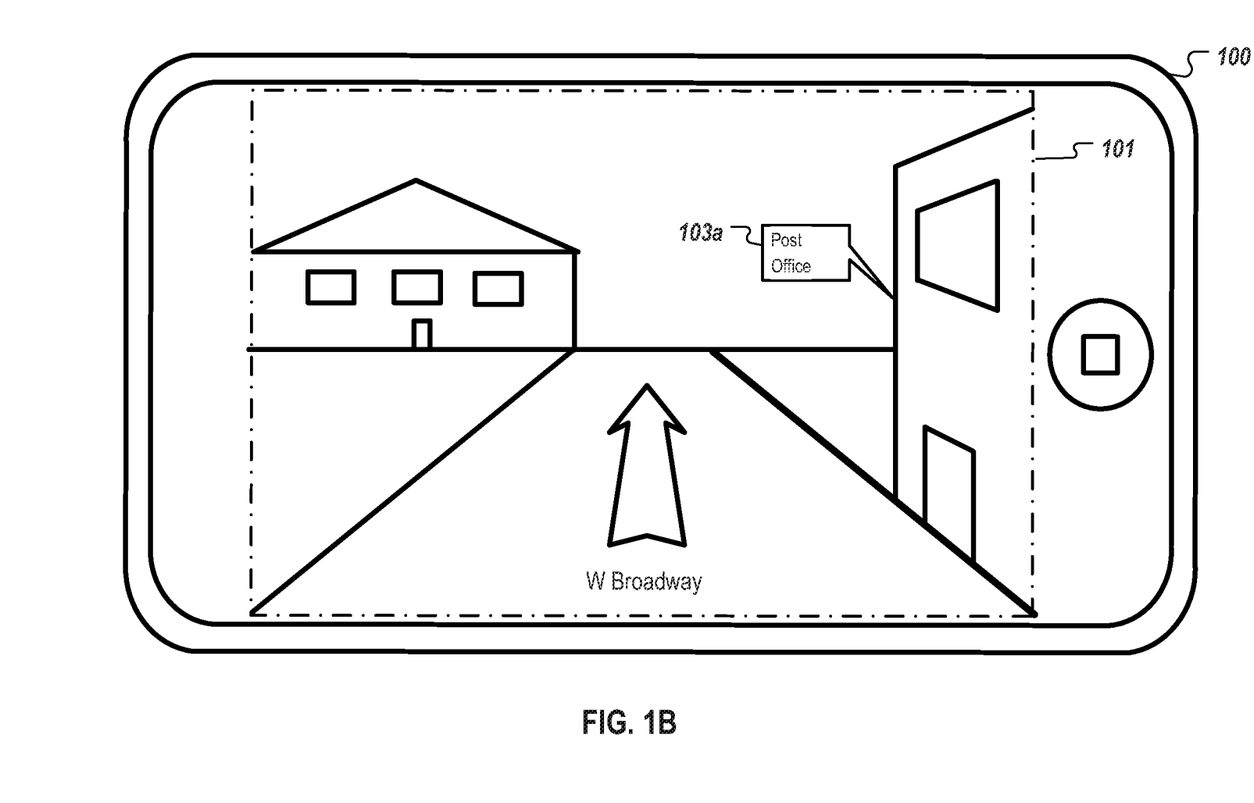

FIG. 1B illustrates the result of the user's +Y translation of device 100. The +Y translation resulted in the observer automatically navigating the corner of South Main Street and West Broadway to face in the direction of West Broadway. The user can now move the device forward or backward to move the observer up and down West Broadway. When moving forward or backward, information 103a can be displayed in GUI 101. In this example, a bubble was displayed for identifying a building (e.g., identifying the post office) on West Broadway. To prevent information clutter in GUI 101, information can be displayed or hidden as the observer moves up or down the street based on the observer's location and perspective in the panoramic imagery. In some implementations, information is displayed after a period of time has elapsed without the observer moving. Information can be aggregated into information layers. When an observer is at a particular location on the street or has a particular perspective in the panoramic imagery, an information layer containing information of an information type (e.g., business information) can be displayed over the panoramic imagery.

Figure 1C:
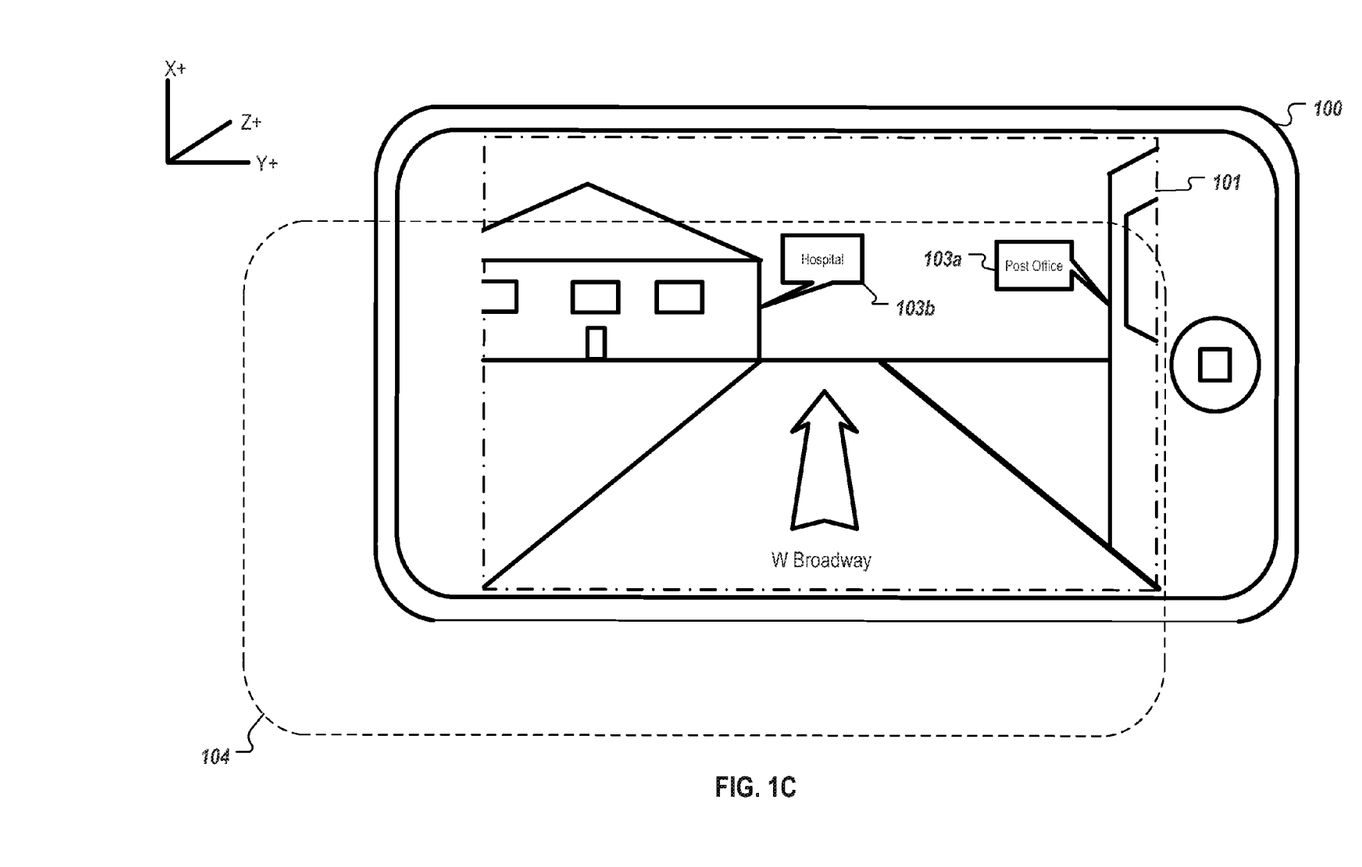

Referring to FIG. 1C, as the observer moves down West Broadway resulting from a forward transition from an original position 104 (indicated by the dashed line), information 103b (e.g., identifying a hospital) is displayed, since the observer has moved closer to the hospital. In some implementations, a threshold can be set by a user or application based on the distance between the observer and a structure or object in the panoramic imagery. When the threshold distance is reached or exceeded, information or an information layer can be displayed or hidden.

In some implementations, translation movements are made by the user physically moving device 100 from right to left or backward or forward or vice versa. These translations are detected by a two or three axis accelerometer sensor onboard device 100. Software executed by a processor onboard device 100 can read the acceleration readings from the accelerometer sensor. In addition, device 100 can have angular rate sensors (e.g., gyro sensor) and/or magnetometer that detects orientation of device 100 with respect to a reference coordinate frame, such as a local level coordinate frame (e.g., North, East, Down or NED).

The orientation of device 100 can be determined using Euler angles computed from sensed angular rates provided by the gyro sensor. When the user first enters street-level view, sensor readings can be made and a local level reference frame established using the readings and well-known mathematical methods. When the user translates device 100, the acceleration data (e.g., acceleration vector) generated in response to the translation can be used to determine the direction and distance of the translation. The distance of the translation can be computed by integrating the acceleration data twice. In some implementations, distance data can be obtained using an onboard camera by measuring translation of the device from image sensor data. For example, the pixel locations in images sensed at the two locations can be differenced, and a translation distance of the device can be determined from the computed pixel differences using a suitable coordinate transformation, such as image sensor coordinates to local level coordinates. For motion or image sensors, the distance can be relative or absolute depending on the output of the motion or image sensor.

Alternatively, an optical flow can be used to determine the distance data. Optical flow is a pattern of apparent motion of objects, surfaces, and edges in the panoramic imagery caused by the relative motion between the observer and the panoramic imagery. Some examples of optical flow techniques include but are not limited to phase correlation (inverse of normalized cross-power spectrum), block-based methods (minimizing sum of squared differences or sum of absolute differences), maximizing normalized cross-correlation or differential methods of estimating optical flow based on partial derivatives of the image signal and/or the sought flow field and higher-order partial derivatives (e.g., Lucas-Kanade, Horn-Schunck, Buxton-Buxton, Black-Jepson).

The translation distance can be scaled to units that are appropriate for the panoramic imagery. The scaled distance can be used to determine how far the user moves in the panoramic imagery. Since there are limits on how far a device can be translated physically by a user and still have a viewable display, translations will have maximum and minimum translation distances. If a maximum translation distance is reached or exceeded, no navigation commands are issued. If a minimum distance translation is not reached or exceeded, no navigation commands are issued. The minimum distance translation can prevent small, unintentional translation movements (e.g., due to the user's hand shaking) from falsely triggering navigation commands.

Once device 100 knows the direction and distance of translation, the direction and distance can be mapped to one or more navigation commands. Referring to the example of FIGS. 1A and 1B, when the user translated the device from left to right to enter West Broadway, the translation was detected and identified as a right translation. The right translation was then mapped to a navigation command to navigate automatically a corner of an intersection in the panoramic imagery. The mapping can be implemented in a database table that maps a set of translations into a set of navigation commands.

In some implementations, translations can be associated with more than one navigation command based on context. For example, when a right translation is detected and the observer is standing at an intersection of a virtual street in the panoramic imagery, the right translation can be mapped to the navigation command for moving the observer around a corner of the intersection, such as described in reference to FIGS. 1A-1B. However, if the observer is not at an intersection in the panoramic imagery then the right translation command can initiate panning of the observer's perspective at the current location on the virtual street in the panoramic imagery. Similarly, if the observer is standing in front of an entrance to a structure, and a forward translation is detected, the forward translation can be mapped to a navigation command to move the observer into the structure or perform a zoom operation. When the observer is inside the structure, forward/backward translation could perform other actions, such as selecting an object for purchase, etc.

In some implementations, if the user holds device 100 at a first threshold distance (e.g., the maximum translation distance), the corresponding navigation command can execute continuously (e.g., continue to move down a street or pan) until the user moves device 100 to a second threshold distance (e.g., close to the origin of the local level coordinate frame). The speed at which an observer navigates panoramic imagery can be based on the translation distance, where the speed of the observer is proportional to the translation distance.

In some implementations, panoramic imagery can be presented on the displays of multiple, physically adjacent devices (e.g., two adjacent smart phones or electronic tablets) to increase the physical display area for the panoramic imagery. Sensor input can come from any combination of devices. For example, two adjacent electronic tablets can be arranged in a variety of portrait/landscape configurations. In one configuration, both tablets can be in portrait orientation. In a second configuration, both tablets can be in a landscape configuration. In a third configuration, one tablet can be in portrait orientation and the other tablet can be in landscape orientation. Although the overall layout is consistent, the relative orientations of the tablets to each other allow for a rich interaction, such as filtering, layering information, navigation information visualization, etc. Additionally, a 3D layout of multiple devices enables observing occluded or interior information. Some of the devices can be static while others can be moving (e.g., held by a hand).

Exemplary Processes

Figure 2:
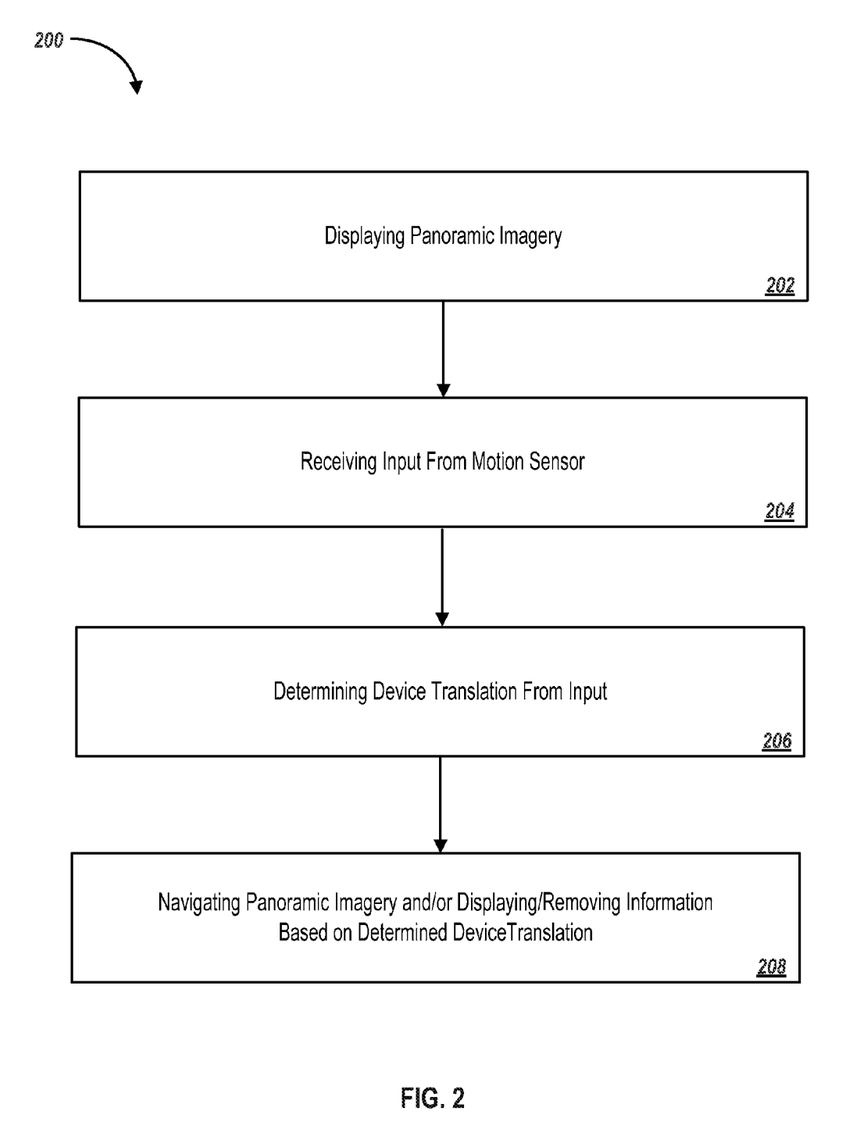
FIG. 2 is a flow diagram of an exemplary process for navigating panoramic imagery.

FIG. 2 is a flow diagram of an exemplary process 200 for navigating panoramic imagery. In some implementations, process 200 can be implemented by device architecture 400 described in reference to FIG. 2.

In some implementations, process 200 can begin by displaying panoramic imagery (202). For example, the user can enter into a street-level view, where the user can navigate panoramic imagery at a particular location on the street using navigation controls (e.g., navigation buttons, joystick, touch gestures).

Process 200 can continue by receiving input from a motion sensor (204). Input can be output of an accelerometer sensor (e.g., a 3-axis accelerometer). The input can be provided when the user translates a device running process 200.

Process 200 can continue by determining a device translation from the input (206). A local level coordinate frame (e.g., NED) can be determined from the location of the device provided by a positioning system (e.g., GPS, WiFi) and an acceleration vector (e.g., gravity vector) provided by the accelerometer sensor. Euler angles computed from an onboard gyro sensor can be used to determine the orientation of the device with respect to the local level coordinate frame using know mathematical methods. Once the local level reference frame and the orientation of the device with respect to the local level coordinate frame have been established, the direction and distance of a translation can be determined.

Process 200 can continue by navigating the panoramic imagery and/or displaying information based on the determined translation (208). Once the direction of translation is identified (e.g., left-right, forward-backward), a navigation command can be selected corresponding to the identified translation and executed by an on board processor.

The current context of the panoramic imagery can also be used to determine a navigation command. For example, if the location of the observer is on a street, a forward translation can map to a navigation command to move the observer down the street. If, however, the location of the observer is facing an entrance to a structure (e.g., a commercial business), a forward translation can map to a navigation command to move the observer into the structure through the entrance.

Exemplary Operating Environment

Figure 3:
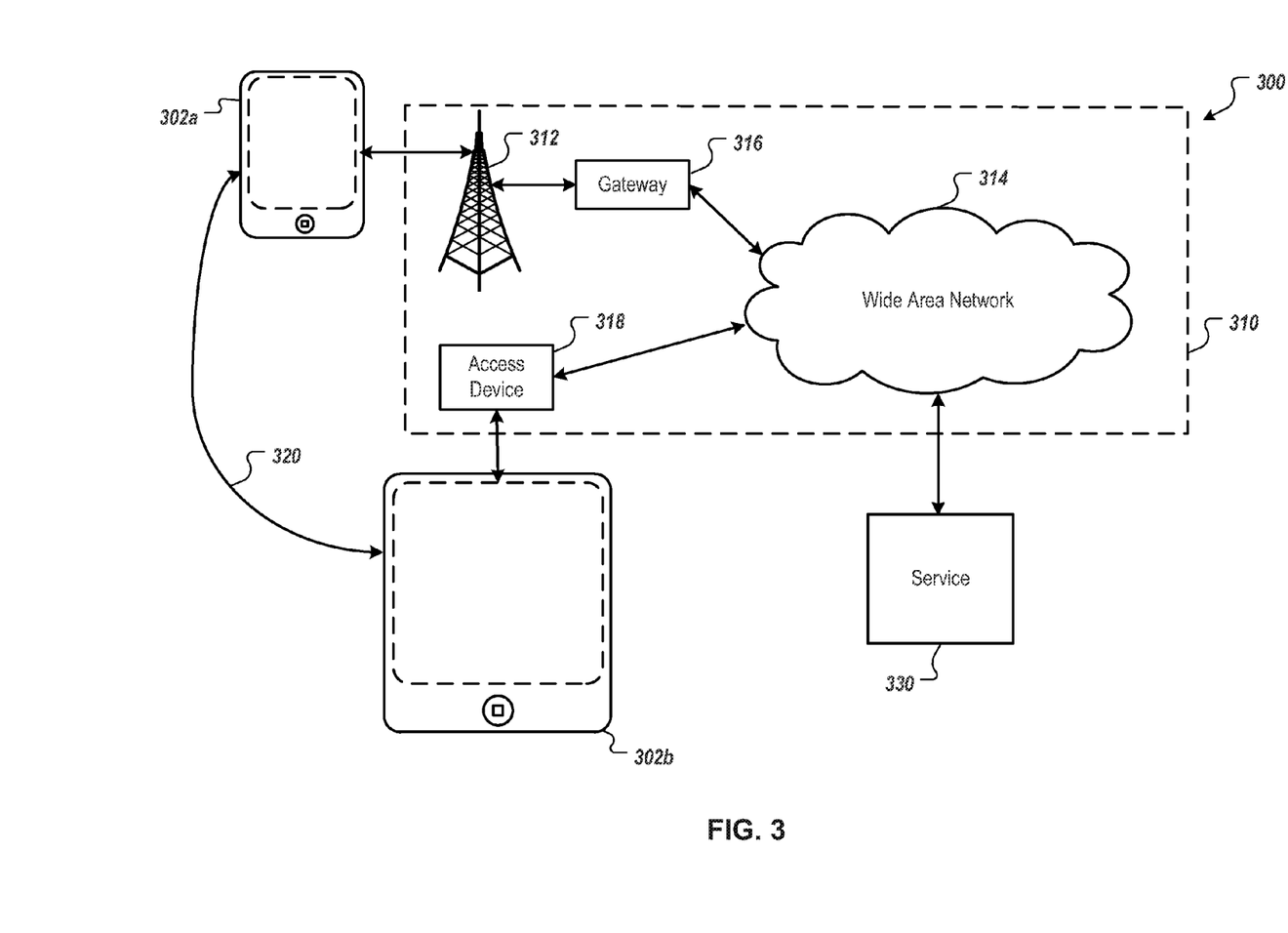
FIG. 3 illustrates an exemplary operating environment for a device that is capable of implementing the features described in reference to FIGS. 1-2.

FIG. 3 illustrates an exemplary operating environment 300 for a device that is capable of implementing the features described in reference to FIGS. 1-2. In some implementations, devices 302a and 302b can communicate over one or more wired or wireless networks 310. For example, wireless network 312 (e.g., a cellular network) can communicate with a wide area network (WAN) 314 (e.g., the Internet) by use of gateway 316. Likewise, access device 318 (e.g., IEEE 802.11g wireless access device) can provide communication access to WAN 314. Devices 302a, 302b can be any portable device capable of displaying a GUI for displaying contact GUI, including but not limited to smart phones and electronic tablets.

In some implementations, both voice and data communications can be established over wireless network 312 and access device 318. For example, device 302a can place and receive phone calls (e.g., using voice over Internet Protocol (VoIP) protocols), send and receive e-mail messages (e.g., using SMTP or Post Office Protocol 3 (POP3)), and retrieve electronic documents and/or streams, such as web pages, photographs, and videos, over wireless network 312, gateway 316, and WAN 314 (e.g., using Transmission Control Protocol/Internet Protocol (TCP/IP) or User Datagram Protocol (UDP)). Likewise, in some implementations, device 302b can place and receive phone calls, send and receive e-mail messages, and retrieve electronic documents over access device 318 and WAN 314.

Devices 302a and 302b can also establish communications by other means. For example, wireless device 302a can communicate with other wireless devices (e.g., other devices 302a or 302b, cell phones) over the wireless network 312. Likewise, devices 302a and 302b can establish peer-to-peer communications 320 (e.g., a personal area network) by use of one or more communication subsystems, such as the Bluetooth™ communication devices. Other communication protocols and topologies can also be implemented.

Devices 302a or 302b can communicate with service 330 over the one or more wired and/or wireless networks 310. For example, service 330 can provide a Web-based street-level navigation service, satellite or map application for implementing the features described in reference to FIGS. 1-2.

Exemplary Device Architecture

Figure 4:
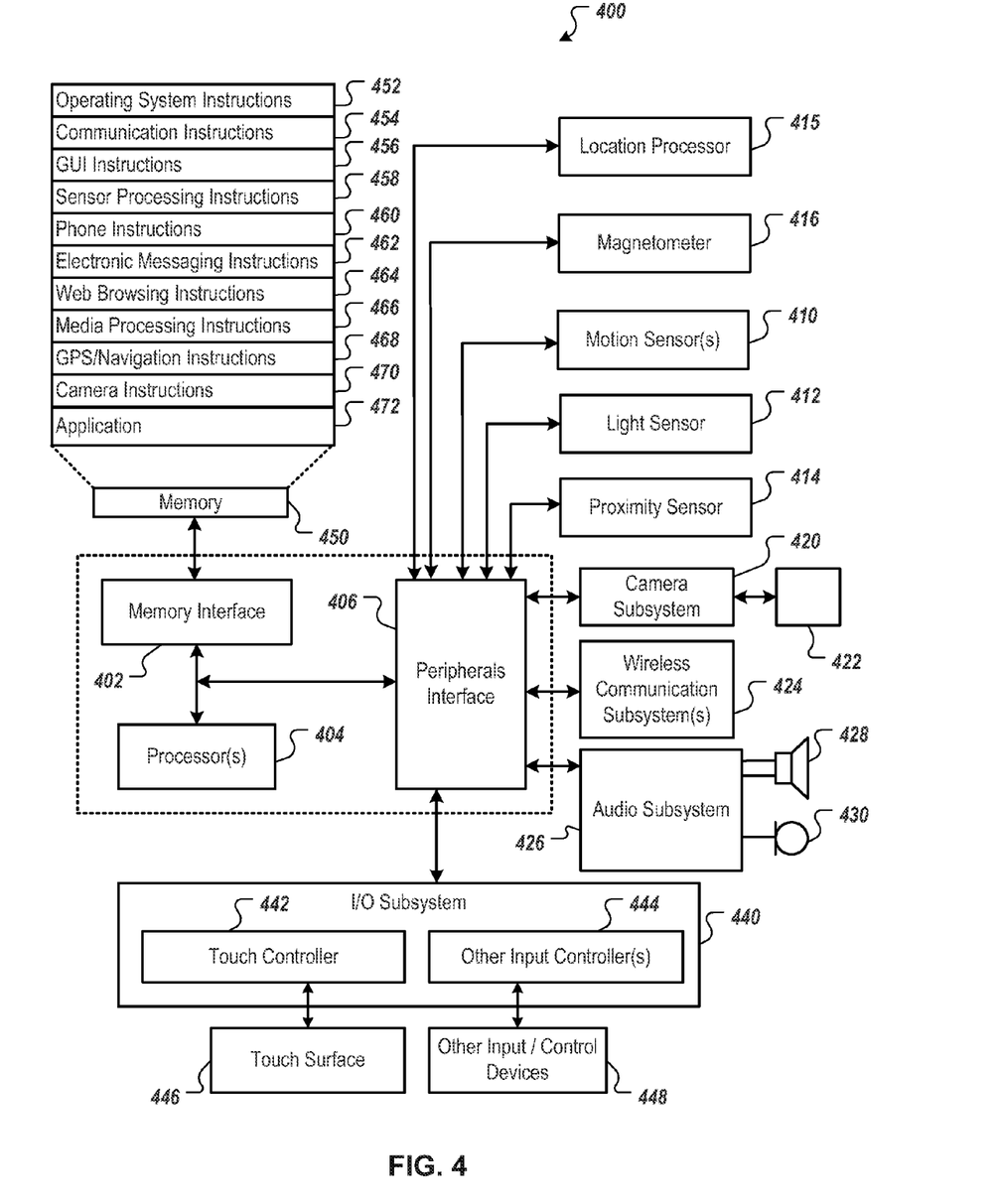
FIG. 4 illustrates an exemplary device architecture for implementing the features described in reference to FIGS. 1-3.

FIG. 4 is a block diagram illustrating exemplary device architecture that implements features and processes described in reference to FIGS. 1-3. Architecture 400 can be implemented in any portable device for generating the features described in reference to FIGS. 1-3, including but not limited to smart phones, electronic tablets, gaming devices, video cameras, etc. Architecture 400 can include memory interface 402, data processor(s), image processor(s) or central processing unit(s) 404, and peripherals interface 406. Memory interface 402, processor(s) 404 or peripherals interface 406 can be separate components or can be integrated in one or more integrated circuits. The various components can be coupled by one or more communication buses or signal lines.

Sensors, devices, and subsystems can be coupled to peripherals interface 406 to facilitate multiple functionalities. For example, motion sensor 410, light sensor 412, and proximity sensor 414 can be coupled to peripherals interface 406 to facilitate orientation, lighting, and proximity functions of the device. For example, in some implementations, light sensor 412 can be utilized to facilitate adjusting the brightness of touch surface 446. In some implementations, motion sensor 410 (e.g., an accelerometer sensor, gyro sensor) can be utilized to detect movement and orientation of the device. Accordingly, display objects or media can be presented according to a detected orientation (e.g., portrait or landscape).

Other sensors can also be connected to peripherals interface 406, such as a temperature sensor, a biometric sensor, or other sensing device, to facilitate related functionalities.

Location processor 415 (e.g., GPS receiver) can be connected to peripherals interface 406 to provide geo-positioning. Electronic magnetometer 416 (e.g., an integrated circuit chip) can also be connected to peripherals interface 406 to provide data that can be used to determine the direction of magnetic North. Thus, electronic magnetometer 416 can be used as an electronic compass.

Camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 424. Communication subsystem(s) 424 can include one or more wireless communication subsystems. Wireless communication subsystems 424 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 424 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 424 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 426 can be coupled to a speaker 428 and one or more microphones 430 to facilitate voice-enabled functions, such as voice recognition, voice replication, digital recording, and telephony functions.

I/O subsystem 440 can include touch controller 442 and/or other input controller(s) 444. Touch controller 442 can be coupled to a touch surface 446. Touch surface 446 and touch controller 442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 can display virtual or soft buttons and a virtual keyboard, which can be used as an input/output device by the user.

Other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of speaker 428 and/or microphone 430.

In some implementations, device 400 can present recorded audio and/or video files, such as MP3, AAC, and MPEG files. In some implementations, device 400 can include the functionality of an MP3 player and may include a pin connector for tethering to other devices. Other input/output and control devices can be used.

Memory interface 402 can be coupled to memory 450. Memory 450 can include high-speed random access memory or non-volatile memory, such as one or more magnetic disk storage devices, one or more optical storage devices, or flash memory (e.g., NAND, NOR). Memory 450 can store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers or servers. Communication instructions 454 can also be used to select an operational mode or communication medium for use by the device, based on a geographic location (obtained by the GPS/Navigation instructions 468) of the device. Memory 450 may include graphical user interface instructions 456 to facilitate graphic user interface processing, such as generating GUI 101 shown in FIGS. 1A-1C; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes, including navigation of panoramic imagery; camera instructions 470 to facilitate camera-related processes and functions; and instructions 472 for an application that is capable of implementing the features described in reference to FIGS. 1-3. The memory 450 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method performed by a processing system, comprising:
    displaying panoramic imagery on a display of a mobile device, wherein the panoramic imagery appears to an observer as a three dimensional panoramic view;
    receiving input from one or more sensors onboard the mobile device, the one or more sensors comprising at least one of an accelerometer or an image sensor;
    determining a device translation using the input from the one or more sensors, wherein the device translation includes determining a translation direction and distance of the mobile device and wherein the device translation results from the observer physically moving the mobile device left, right, forward, or backward;
    determining a context in the panoramic imagery; and
    navigating the imagery based on a mapping of the device translation to at least one navigation command, wherein the mapping is based on the context.

2. The method of claim 1, further comprising:
    displaying information or an information layer over the panoramic imagery.

3. The method of claim 1, wherein the mapping of the device translation to at least one navigation command is further based on at least one of the translation direction or the translation distance.

4. The method of claim 1, where the display of the mobile device has at least one of a landscape configuration or a portrait configuration.

5. The method of claim 1, wherein navigating the imagery comprises:
    continuously navigating imagery until a threshold translation distance is reached or exceeded.

6. The method of claim 1, further comprising:
    determining if the translation has reached or exceeded a maximum or minimum translation distance; and
    navigating imagery based on results of the determining.

7. The method of claim 1, where the device is a smart phone or electronic tablet.

8. The method of claim 1, wherein the mapping of the device translation to at least one navigation command comprises:
    mapping the translation direction to the at least one navigation command based on a location in the panoramic imagery.

9. The method of claim 1, wherein displaying panoramic imagery on a display of a mobile device, comprises:
    displaying the panoramic imagery on two or more adjacent devices.

10. The method of claim 1, wherein the one or more sensors facilitate detecting the movement of the mobile device respective to the observer.

11. The method of claim 1, wherein the device translation can further enable the observer to select items for purchase, and wherein the device translation occurs when the observer is navigating the imagery and the observer appears to be within a structure.

12. The method of claim 1, wherein, in addition to the one or more sensors comprising at least one of the accelerometer or the image sensor, the one or more sensors further comprises at least one of:
    an angular rate sensor,
    a magnetometer,
    a camera, or
    a geographical positioning system (GPS) sensor.

13. The method of claim 1, wherein the navigation of the imagery based on the mapping of the device translation to the at least one navigation command comprises:
    mapping the determined device translation to at least one navigation command,
        wherein the determined context selects the navigation command from a set of possible navigation commands,
        wherein, when the mapped device translation is a left or a right translation, the mapped device translation can enable the observer to automatically navigate one or more corners of an intersection or a structure in the panoramic imagery, and
        wherein, when the mapped device translation is a forward translation, the mapped device translation can enable the observer to move up or down a street in the panoramic imagery, move into the structure, perform a zoom operation when facing the structure, or select an object for purchase once the observer is inside the structure.

14. A system comprising:
    one or more sensors comprising at least one of an accelerometer or an image sensor;
    a processing system comprising one or more processors;
    a display coupled to the processing system;
    memory coupled to the processing system, wherein the memory stores executable program instructions which when executed by the processing system cause the processing system to perform a method, the method comprising:
    displaying panoramic imagery on the display of a mobile device, wherein the panoramic imagery appears to an observer as a three dimensional panoramic view;
    receiving input from at least one of the sensors onboard the mobile device;
    determining a device translation using the input from at least one of the sensors, wherein the device translation includes determining a translation direction and distance of the mobile device, wherein the device translation results from the observer physically moving the mobile device left, right, forward or backward;
    determining a context in the panoramic imagery; and
    navigating the imagery based on a mapping of the device translation to at least one navigation command, wherein the mapping is based on the context.

15. The system of claim 14, wherein the processing system displays information or an information layer over the panoramic imagery.

16. The system of claim 14, wherein the mapping of the device translation to at least one navigation command is further based on at least one of the translation direction or the translation distance.

17. The system of claim 14, wherein the display of the mobile device has at least one of a landscape configuration or a portrait configuration.

18. The system of claim 14, wherein, the processing system continuously navigates imagery until a threshold translation distance is reached or exceeded.

19. The system of claim 14, wherein the method performed by the processing system further comprises:
 determining if the translation has reached or exceeded a maximum or minimum translation distance; and
 navigating imagery based on results of the determining.

20. The system of claim 14, wherein the mobile device is a smart phone or electronic tablet.

21. The system of claim 14, wherein the processing system-maps the translation direction to a navigation command based on a location in the panoramic imagery.

22. The system of claim 14, wherein the processing system displays the panoramic imagery on two or more adjacent devices.

23. The system of claim 14, wherein the one or more sensors facilitate detecting the movement of the mobile device respective to the observer.

24. The system of claim 14, wherein the device translation can further enable the observer to select items for purchase, and wherein the device translation occurs when the observer is navigating the imagery and the observer appears to be within a structure.

25. The system of claim 14, wherein, in addition to the one or more sensors comprising at least one of the accelerometer or the image sensor, the one or more sensors further comprises at least one of:
 an angular rate sensor,
 a magnetometer,
 a camera, or
 a geographical positioning system (GPS) sensor.

26. The system of claim 14, wherein the navigation of the imagery based on the mapping of the device translation to the at least one navigation command comprises:
 mapping the determined device translation to at least one navigation command,
  wherein the determined context selects the navigation command from a set of possible navigation commands,
  wherein, when the mapped device translation is a left or a right translation, the mapped device translation can enable the observer to automatically navigate one or more corners of an intersection or a structure in the panoramic imagery, and
  wherein, when the mapped device translation is a forward translation, the mapped device translation can enable the observer to move up or down a street in the panoramic imagery, move into the structure, perform a zoom operation when facing the structure, or select an object for purchase once the observer is inside the structure.

27. A non-transitory computer readable medium comprising instructions which when executed by a processing system, including one or more processors, executes a method, the method comprising:
 displaying panoramic imagery on a display of a mobile device, wherein the panoramic imagery appears to an observer as a three dimensional panoramic view;
 receiving input from one or more sensors onboard the mobile device, the one or more sensors comprising at least one of an accelerometer or an image sensor;
 determining a device translation using the input from the one or more sensors, wherein the device translation includes determining a translation direction and distance of the mobile device and wherein the device translation results from the observer physically moving the mobile device left, right, forward or backward;
 determining a context in the panoramic imagery; and
 navigating the imagery based on a mapping of the device translation to at least one navigation command, wherein the mapping is based on the context.

28. The non-transitory computer readable medium of claim 27, further comprising:
 displaying information or an information layer over the panoramic imagery.

29. The non-transitory computer readable medium of claim 27, wherein the mapping of the device translation to at least one navigation command is further based on at least one of the translation direction or the translation distance.

30. The non-transitory computer readable medium of claim 27, wherein the display has at least one of a landscape configuration or a portrait configuration.

31. The non-transitory computer readable medium of claim 27, wherein navigating the imagery further comprises:
 continuously navigating imagery until a threshold translation distance is reached or exceeded.

32. The non-transitory computer readable medium of claim 27, further comprising:
 determining if the translation has reached or exceeded a maximum or minimum translation distance; and
 navigating imagery based on results of the determining.

33. The non-transitory computer readable medium of claim 27, wherein the device is a smart phone or electronic tablet.

34. The non-transitory computer readable medium of claim 27, wherein the mapping of the device translation to at least one navigation command comprises:
 mapping the translation direction to a navigation command based on a location in the panoramic imagery.

35. The non-transitory computer readable medium of claim 27, wherein displaying panoramic imagery on a display of a mobile device, comprises:
 displaying the panoramic imagery on two or more adjacent devices.

36. The non-transitory computer readable medium of claim 27, wherein the navigation of the imagery based on the mapping of the device translation to the at least one navigation command comprises:
 mapping the determined device translation to at least one navigation command,
  wherein the determined context selects the navigation command from a set of possible navigation commands,
  wherein, when the mapped device translation is a left or a right translation, the mapped device translation can enable the observer to automatically navigate one or more corners of an intersection or a structure in the panoramic imagery, and
  wherein, when the mapped device translation is a forward translation, the mapped device translation can enable the observer to move up or down a street in the panoramic imagery, move into the structure, perform a zoom operation when facing the structure, or select an object for purchase once the observer is inside the structure.

* * * * *